United States Patent
Kwon (10) Patent No.: US 9,451,283 B2
(45) Date of Patent: Sep. 20, 2016

(54) METHOD, SYSTEM AND COMPUTER PROGRAM PRODUCT FOR SELECTING A MOTION VECTOR IN SCALABLE VIDEO CODING

(75) Inventor: Do-Kyoung Kwon, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1053 days.

(21) Appl. No.: 13/542,123

(22) Filed: Jul. 5, 2012

(65) Prior Publication Data

US 2013/0010871 A1 Jan. 10, 2013

Related U.S. Application Data

(60) Provisional application No. 61/504,483, filed on Jul. 5, 2011.

(51) Int. Cl.
H04N 7/32 (2006.01)
H04N 19/57 (2014.01)
H04N 19/33 (2014.01)

(52) U.S. Cl.
CPC .............. *H04N 19/57* (2014.11); *H04N 19/33* (2014.11)

(58) Field of Classification Search
CPC ....... H04N 19/33; H04N 19/57; H04N 19/30
USPC ........................... 375/240.16, E7.105, E7.243
See application file for complete search history.

(56) References Cited

U.S. PATENT DOCUMENTS 5,428,403 A * 6/1995 Andrew et al. ................ 348/699
5,557,341 A * 9/1996 Weiss .................... G06T 7/2026
348/699
2012/0063516 A1 3/2012 Kwon et al.

OTHER PUBLICATIONS

Liu et al. "Motion Aligned Spatial Scalable Video Coding," Multimedia and Expo, 2006 IEEE International Conference on , vol., No., pp. 117,120, Jul. 9-12, 2006.*
Francois et al. "Interlaced Video Coding", IEEE Transactions on Circuits and Systems for Video Technology, vol. 17 Sep. 2007.*
Kwon et al., "Base-Layer Motion Estimation with Limited Enhancement-Layer Search Window for Hardware H.264/SVC Encoder", ISCAS, May 20-23, 2012, pp. 1552-1555, IEEE, Seoul, South Korea.
Ohm, "Overview of Scalable Video Coding", International Organization for Standardization ISO/IEC JYC1/SC29/WG11 MPEG2008/N9792, pp. 103, Apr. 2008, Archamps, France.

* cited by examiner

*Primary Examiner* — William C Vaughn, Jr.
*Assistant Examiner* — Naod Belai
(74) *Attorney, Agent, or Firm* — Michael A. Davis, Jr.; Frank D. Cimino (57) ABSTRACT

From among blocks within a region of a first image, a search is performed for a highest scoring match to a block of a second image. Searching for the highest scoring match includes penalizing scores of blocks outside a portion of the region versus scores of blocks within the portion of the region. A motion vector is coded between the block of the second image and the highest scoring match.

30 Claims, 5 Drawing Sheets

METHOD, SYSTEM AND COMPUTER PROGRAM PRODUCT FOR SELECTING A MOTION VECTOR IN SCALABLE VIDEO CODING

CROSS-REFERENCE TO RELATED APPLICATION

This application claims priority to U.S. Provisional Patent Application Ser. No. 61/504,483, filed Jul. 5, 2011, entitled IMPROVED BASE-LAYER MOTION ESTIMATION FOR LIMITED ENHANCEMENT-LAYER SEARCH RANGE FOR REAL-TIME H.264/SVC ENCODER, naming Do-Kyoung Kwon as inventor, which is hereby fully incorporated herein by reference for all purposes.

BACKGROUND

The disclosures herein relate in general to digital image processing, and in particular to a method, system and computer program product for selecting a motion vector in scalable video coding.

Scalable video coding ("SVC") is one technique for allowing a range of devices to receive digitized images, according to variations in such devices' respective capabilities (e.g., bitrate, resolution and quality), network conditions, and/or user preferences. The H.264/SVC standard is a scalable video coding extension of the H.264/AVC standard, which has been developed by the Video Coding Experts Group ("VCEG") of the International Telecommunication Union's Telecommunication Standardization Sector ("ITU-T"), together with the Moving Picture Experts Group ("MPEG") of the International Organization for Standardization ("ISO") and International Electrotechnical Commission ("IEC"). The H.264/SVC standard provides temporal scalability, spatial scalability, and quality scalability. For example, the H.264/SVC standard allows a video sequence to be encoded and decoded as a single scalable bit stream that includes a base layer bit stream and one or more enhancement layer bit streams, which are suitable for accommodating such variations. Nevertheless, when implementing the H.264/SVC standard, more improvement is possible for selecting a motion vector.

SUMMARY

From among blocks within a region of a first image, a search is performed for a highest scoring match to a block of a second image. Searching for the highest scoring match includes penalizing scores of blocks outside a portion of the region versus scores of blocks within the portion of the region. A motion vector is coded between the block of the second image and the highest scoring match.

DETAILED DESCRIPTION

Figure 1:
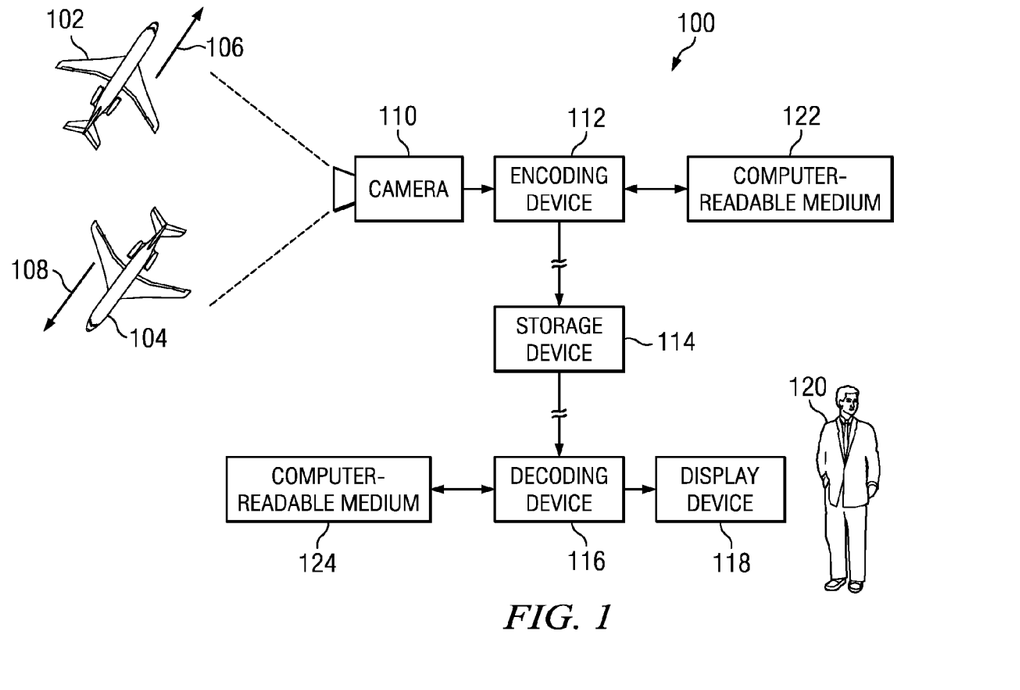
FIG. 1 is a block diagram of an information handling system of the illustrative embodiments.

FIG. 1 is a block diagram of an information handling system (e.g., at least one desktop computer, digital television, or portable battery-powered electronics device, such as a mobile smartphone, tablet computing device, netbook computer, or laptop computer), indicated generally at 100, of the illustrative embodiments. In the example of FIG. 1, physical objects 102 and 104 are capable of moving in various directions (e.g., as indicated by arrows 106 and 108, respectively). During a period of time, a video camera 110: (a) views such objects and their surrounding foregrounds and backgrounds; (b) digitizes images of such views; and (c) outputs a video sequence of such digitized (or "digital") images to an encoding device 112.

From the camera 110, the encoding device 112 receives such images (e.g., pictures). The encoding device 112 encodes such images into a binary logic bit stream. Also, the encoding device 112 outputs the bit stream to a storage device 114, which receives and stores the bit stream. In one embodiment, the encoding device 112 performs such encoding (and a decoding device 116 likewise performs decoding) in accordance with a standard (e.g., the H.264/SVC standard, which is a scalable video coding extension of the H.264/AVC standard). For example, the standard determines a macroblock's size and dimensions.

The decoding device 116 reads the bit stream from the storage device 114. In response to the bit stream, the decoding device 116 decodes the bit stream into such images. Also, the decoding device 116 outputs such images to a display device 118 for display to a human user 120. The display device 118: (a) receives such images from the decoding device 116 (e.g., in response to a command that the user 120 specifies via a touchscreen of the display device 118); and (b) in response thereto, displays such images (e.g., visual images of the objects 102 and 104 and their surrounding foregrounds and backgrounds), which are viewable by the user 120. The display device 118 is any suitable display device, such as a plasma display, a liquid crystal display ("LCD"), or a light emitting diode ("LED") display.

The encoding device 112 performs its operations in response to instructions of a computer-readable program that is stored on a computer-readable medium 122 (e.g., hard disk drive, flash memory card, or other nonvolatile storage device). Also, the computer-readable medium 122 stores a database of information for operations of the encoding device 112. Similarly, the decoding device 116 performs its operations in response to instructions of a computer-readable program that is stored on a computer-readable medium 124. Further, the computer-readable medium 124 stores a database of information for operations of the decoding device 116.

The system 100 is formed by electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first mobile smartphone includes the camera 110, the encoding device 112, and the computer-readable medium 122; and (b) a second mobile smartphone includes the decoding device 116, the display device 118 and the computer-readable medium 124. In another embodiment, before the camera 110 outputs such images to the encoding device 112, the camera 110 enhances such images by one or more techniques, such as black clamping, fault pixel correction, color filter array ("CFA") interpolation, gamma correction, white balancing, color space conversion, edge enhancement, automatic focus, and automatic exposure adjustment.

In an alternative embodiment: (a) the encoding device 112 outputs the bit stream directly to the decoding device 116 via a communication channel (e.g., Ethernet, Internet, or wireless communication channel); and (b) accordingly, the decoding device 116 receives and processes the bit stream directly from the encoding device 112 in real-time. In such alternative embodiment, the storage device 114 either: (a) concurrently receives (in parallel with the decoding device 116) and stores the bit stream from the encoding device 112; or (b) is absent from the system 100. In yet another alternative embodiment, the encoding device 112 receives such images from the computer-readable medium 122 as archived video and/or computer-generated video.

Figure 2:
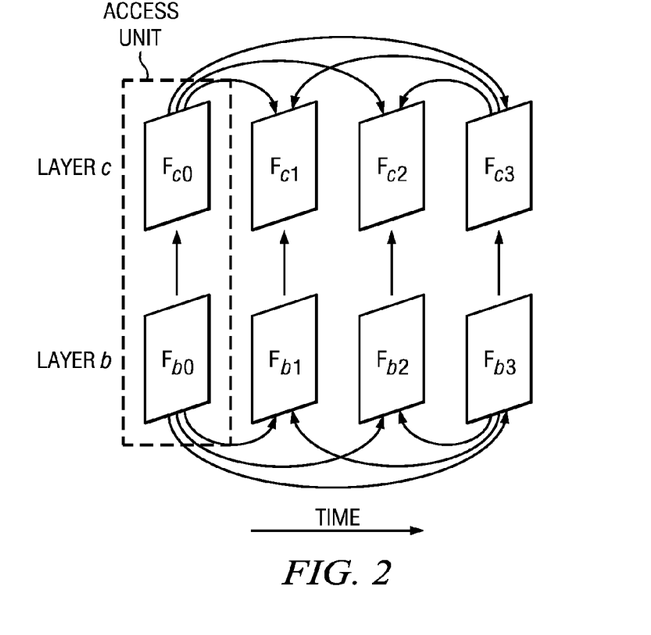
FIG. 2 is a diagram of an example video sequence of digitized images for coding by the system of FIG. 1.

FIG. 2 is a diagram of an example video sequence of digitized images for coding (e.g., encoding and/or decoding) by the system 100. A layer b is a first enhancement layer, which includes at least images $F_{b0}$, $F_{b1}$, $F_{b2}$ and $F_{b3}$ (collectively, "layer b images"). A layer c is a second enhancement layer, which includes at least images $F_{c0}$, $F_{c1}$, $F_{c2}$ and $F_{c3}$ (collectively, "layer c images"). In another example, the layer b is a base (reference) layer.

In FIG. 2, an access unit is formed by a layer b image and its associated (temporally collocated) layer c image, so that the access unit's layer b and layer c images correspond to one another. The layer c image is a higher resolution (lower quantization) version of its corresponding layer b image. Accordingly, FIG. 2 shows a total of four access units, namely: (a) a first access unit, which is outlined by a dashed enclosure for clarity, having the images $F_{b0}$ and $F_{c0}$; (b) a second access unit having the images $F_{b1}$ and $F_{c1}$; (c) a third access unit having the images $F_{b2}$ and $F_{c2}$; and (d) a fourth access unit having the images $F_{b3}$ and $F_{c3}$.

In one embodiment, an image is either: (a) intra coded ("I-frame"); (b) predictive coded ("P-frame"); or (c) bidirectionally predictive coded ("B-frame"). In a first example, the video sequence has a progressive format, and the image is a complete frame from the video sequence. In a second example, the video sequence has an interlaced format, and the image is a field (e.g., odd-numbered scanning lines or even-numbered lines) from the video sequence.

The encoding device 112 encodes each I-frame: (a) in response to information (e.g., previously encoded blocks) within such I-frame ("current I-frame"); and (b) if the current I-frame is a layer c image, then optionally in response to its corresponding layer b image. The encoding device 112 encodes each P-frame: (a) in response to information within such P-frame ("current P-frame"); (b) in response to a previously encoded I-frame, P-frame or B-frame; and (c) if the current P-frame is a layer c image, then optionally in response to its corresponding layer b image. The encoding device 112 encodes each B-frame: (a) in response to information within such B-frame ("current B-frame"); (b) in response to a first previously encoded I-frame, P-frame or B-frame; (c) in response to a second previously encoded I-frame, P-frame or B-frame; and (d) if the current B-frame is a layer c image, then optionally in response to its corresponding layer b image.

Likewise, the decoding device 116 decodes each I-frame: (a) in response to information that was previously decoded for such I-frame ("current I-frame"); and (b) if the current I-frame is a layer c image, then optionally in response to its corresponding layer b image. The decoding device 116 decodes each P-frame: (a) in response to information that was previously decoded for such P-frame ("current P-frame"); (b) in response to a previously decoded I-frame, P-frame or B-frame; and (c) if the current P-frame is a layer c image, then optionally in response to its corresponding layer b image. The decoding device 116 decodes each B-frame: (a) in response to information that was previously decoded for such B-frame ("current B-frame"); (b) in response to a first previously decoded I-frame, P-frame or B-frame; (c) in response to a second previously decoded I-frame, P-frame or B-frame; and (d) if the current B-frame is a layer c image, then optionally in response to its corresponding layer b image.

Accordingly, as indicated by applicable ones of the arrows in the example of FIG. 2: (a) the image $F_{b0}$ is an I-frame; (b) the image $F_{b3}$ is a P-frame, which is encoded and decoded in response to the image $F_{b0}$; (c) the images $F_{b2}$ and $F_{b2}$ are B-frames, which are encoded and decoded in response to the images $F_{b0}$ and $F_{b3}$; (d) the image $F_{c0}$ is an I-frame, which is encoded and decoded in response to $F_{c0}$'s corresponding layer b image $F_{b0}$; (e) the image $F_{c3}$ is a P-frame, which is encoded and decoded in response to the image $F_{c0}$, and in response to $F_{c3}$'s corresponding layer b image $F_{b3}$; (f) the image $F_{c1}$ is a B-frame, which is encoded and decoded in response to the images $F_{c0}$ and $F_{c3}$, and in response to $F_{c1}$'s corresponding layer b image $F_{b1}$; and (g) the image $F_{c2}$ is a B-frame, which is encoded and decoded in response to the images $F_{c0}$ and $F_{c3}$, and in response to $F_{c2}$'s corresponding layer b image $F_{b2}$.

Figure 3:
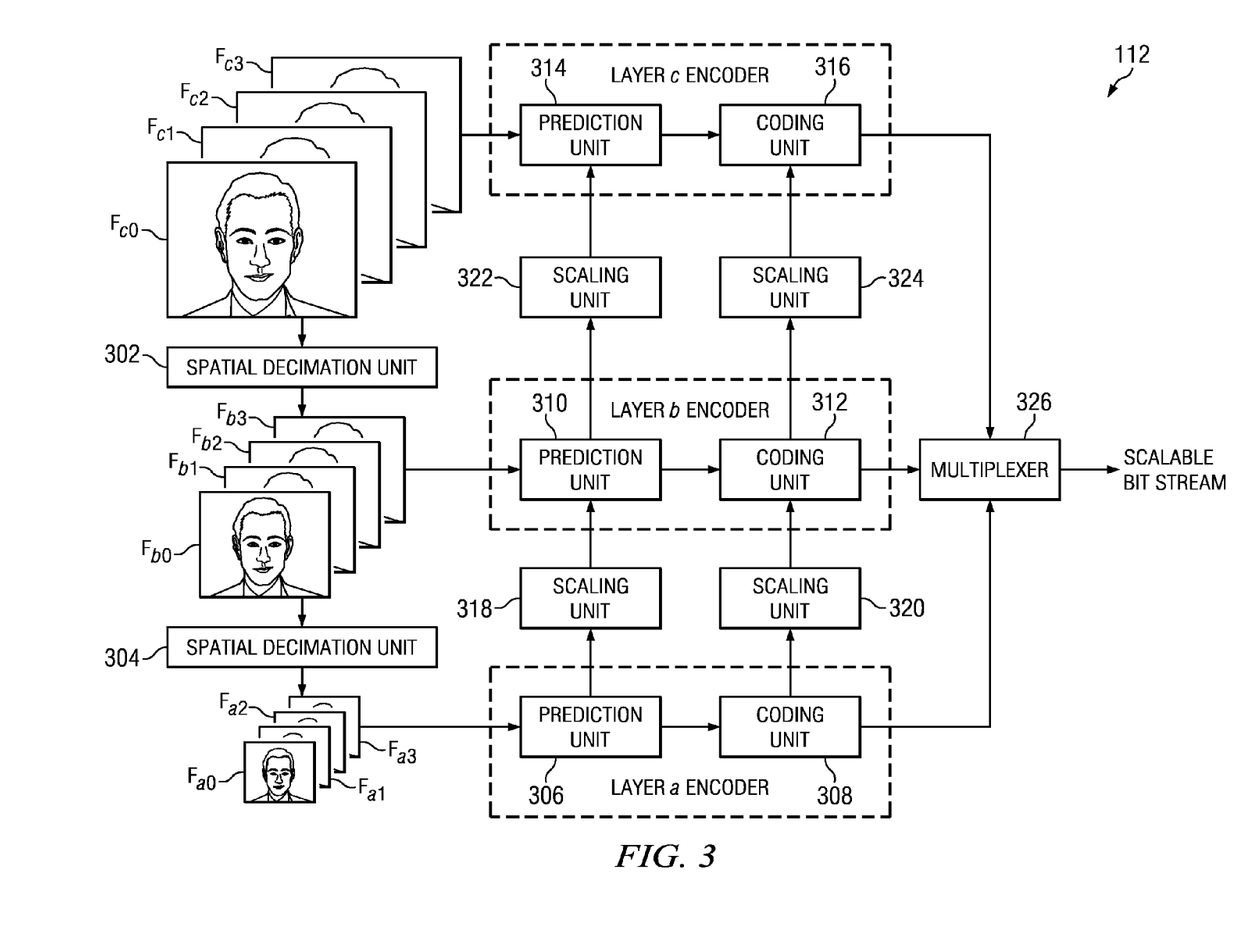
FIG. 3 is a block diagram of an encoding device of the system of FIG. 1.

FIG. 3 is a block diagram of the encoding device 112. In the example of FIG. 3, which extends the example of FIG. 2, a layer a is a base (reference) layer, which includes at least images $F_{a0}$, $F_{a1}$, $F_{a2}$ and $F_{a3}$ (collectively, "layer a images"). The layer a images together form a reference layer for the layer b images. Similarly, the layer b images together form a reference layer for the layer c images.

The encoding device 112 encodes the layer b images and the layer c images with higher spatial resolution, temporal resolution and/or quality (e.g., signal-to-noise ratio ("SNR")) at scalably higher levels over the layer a images. For example, the H.264/SVC standard allows scalability (at a variable ratio ≤2:1) of spatial resolution between an enhancement layer and its reference layer. Accordingly, a spatial decimation unit 302 scales (e.g., downsamples) the images $F_{c0}$, $F_{c1}$, $F_{c2}$ and $F_{c3}$ into lower resolution (higher quantization) images $F_{b0}$, $F_{b1}$, $F_{b2}$ and $F_{b3}$, respectively. Similarly, a spatial decimation unit 304 scales the images $F_{b0}$, $F_{b1}$, $F_{b2}$ and $F_{b3}$ into lower resolution images $F_{a0}$, $F_{a1}$, $F_{a2}$ and $F_{a3}$, respectively.

Figure 4:
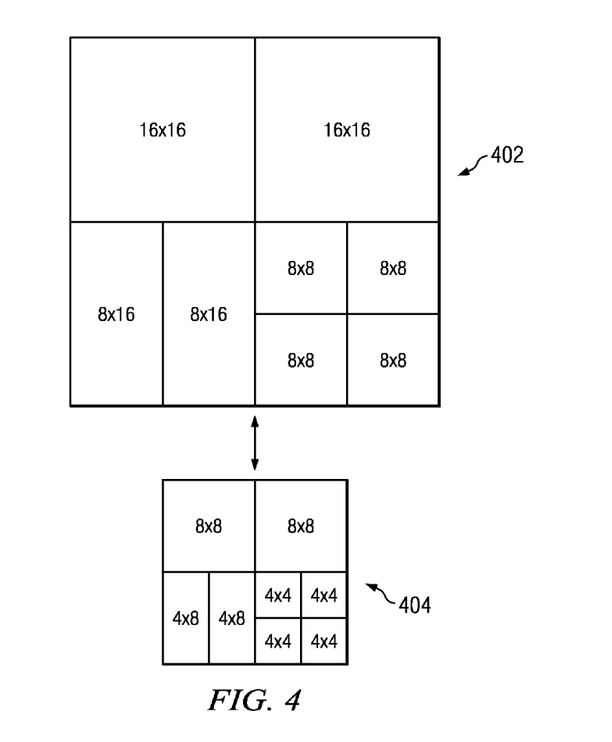
FIG. 4 is a diagram of an example in which a spatial decimation unit of FIG. 3 scales a spatial resolution of four macroblocks down to a single macroblock.

FIG. 4 is a diagram of an example in which the spatial decimation unit 302 scales a spatial resolution of four macroblocks (e.g., from the image $F_{c0}$) down to a single macroblock (e.g., from the image $F_{b0}$). Between an enhancement layer and its reference layer, motion vectors and spatial resolution are scaled by a same ratio as one another. In the dyadic scaling example of FIG. 4, partitions of a macroblock (e.g., 16×16 pixels) within such enhancement layer are scaled by a ratio of 2:1 horizontally and 2:1 vertically to form partitions of a temporally and spatially collocated block (e.g., 8×8 pixels) within such reference layer. However, the scaling ratio is variable on a layer-by-layer basis.

The four macroblocks, indicated generally at 402, include: (a) a first macroblock, which is formed by a 16×16 square block of pixels ("1st macroblock"); (b) a second macroblock, which is formed by a 16×16 square block of pixels ("2nd macroblock"); (c) a third macroblock, which is formed by two 8×16 rectangular blocks of pixels ("3rd macroblock"); and (d) a fourth macroblock, which is formed by four 8×8 square blocks of pixels ("4th macroblock"). The single macroblock, indicated generally at 404, is formed by: (a) two 8×8 square blocks of pixels, which are scaled down from the 1st and 2nd macroblocks, respectively; (b) two 4×8 rectangular blocks of pixels, which are scaled down from the 3rd macroblock; and (c) four 4×4 square blocks of pixels, which are scaled down from the 4th macroblock.

Referring again to FIG. 3, a layer a encoder includes a prediction unit 306 and a coding unit 308. Also, a layer b encoder includes a prediction unit 310 and a coding unit 312. Further, a layer c encoder includes a prediction unit 314 and a coding unit 316.

The layer a encoder performs its operations in response to the layer a images. For encoding a block of an I-frame ("I-frame block"), the prediction unit 306: (a) selects a prediction block from within such I-frame; and (b) computes residuals (e.g., differences in intensity) between such I-frame block's pixels and their spatially collocated pixels within such prediction block.

For encoding a macroblock of a P-frame ("P-frame macroblock"), the prediction unit 306: (a) selects a matching macroblock from within a previously encoded I-frame, P-frame or B-frame of the layer a images; (b) computes a motion vector between such P-frame macroblock and such matching macroblock; and (c) computes residuals between such P-frame macroblock's pixels and their spatially collocated pixels within such matching macroblock.

For encoding a macroblock of a B-frame ("B-frame macroblock"), the prediction unit 306: (a) selects a first matching macroblock from within a first previously encoded I-frame, P-frame or B-frame of the layer a images; (b) selects a second matching macroblock from within a second previously encoded I-frame, P-frame or B-frame of the layer a images; (c) computes first and second motion vectors between such B-frame macroblock and such first and second matching macroblocks, respectively; and (d) computes first residuals between such B-frame macroblock's pixels and their spatially collocated pixels within such first matching macroblock, and computes second residuals between such B-frame macroblock's pixels and their spatially collocated pixels within such second matching macroblock.

The coding unit 308: (a) receives information from the prediction unit 306 about such motion vectors and/or residuals (collectively "layer a prediction information"); and (b) encodes the layer a prediction information for output as a layer a bit stream, which is compliant with the H.264/AVC standard. For example, the coding unit 308 performs such coding by transformation, quantization, inverse quantization, inverse transformation and entropy coding of the layer a prediction information, and by deblocking of layer a reconstruction information.

Also, a scaling unit 318: (a) receives the layer a prediction information from the prediction unit 306; (b) scales the layer a prediction information up to size of the layer b images; and (c) outputs the scaled layer a prediction information to the prediction unit 310. Similarly, a scaling unit 320: (a) receives information from the coding unit 308 about reconstructing the layer a images (collectively "layer a reconstruction information"); (b) scales the layer a reconstruction information up to size of the layer b images; and (c) outputs the scaled layer a reconstruction information to the coding unit 312.

The layer b encoder performs its operations in response to the layer b images, the scaled layer a prediction information from the scaling unit 318, and the scaled layer a reconstruction information from the scaling unit 320. For intra-layer prediction (with reference to neither the scaled layer a prediction information nor the scaled layer a reconstruction information), the layer b encoder performs the same types of operations as the layer a encoder and outputs a layer b bit stream in response thereto. For inter-layer base mode prediction, the layer b encoder determines that a macroblock's prediction mode is the same as such macroblock's temporally and spatially collocated macroblock from within a version of the layer a images scaled up to size of the layer b images ("corresponding layer a macroblock").

For encoding an I-frame block with inter-layer prediction, the prediction unit 310: (a) identifies such I-frame block's temporally and spatially collocated block from within a version of the layer a images scaled up to size of the layer b images ("corresponding layer a block"); and (b) computes residuals (e.g., differences in intensity) between such I-frame block's pixels and their spatially collocated pixels within such corresponding layer a block.

For encoding a P-frame macroblock with inter-layer prediction, the prediction unit 310: (a) identifies such P-frame macroblock's corresponding layer a macroblock; (b) selects a matching macroblock from within a previously encoded I-frame, P-frame or B-frame of the layer b images (e.g., in response to a scaled version of the corresponding layer a macroblock's motion vector from the scaling unit 318, if inter-layer base mode prediction is enabled); (c) if inter-layer base mode prediction is disabled, computes a motion vector between such P-frame macroblock and such matching macroblock; (d) computes residuals between such P-frame macroblock's pixels and their spatially collocated pixels within such matching macroblock ("layer b residuals"); and (e) if inter-layer residual prediction is enabled, reduces the layer b residuals (on a pixel-by-pixel basis) by subtracting the corresponding layer a macroblock's residuals (on a pixel-by-pixel basis).

For encoding a B-frame macroblock with inter-layer prediction, the prediction unit 310: (a) identifies such B-frame macroblock's corresponding layer a macroblock; (b) selects a first matching macroblock from within a first previously encoded I-frame, P-frame or B-frame of the layer b images (e.g., in response to a scaled version of the corresponding layer a macroblock's first motion vector from the scaling unit 318, if inter-layer base mode prediction is enabled); (c) selects a second matching macroblock from within a second previously encoded I-frame, P-frame or B-frame of the layer b images (e.g., in response to a scaled version of the corresponding layer a macroblock's second motion vector from the scaling unit 318, if inter-layer base mode prediction is enabled); (d) if inter-layer base mode prediction is disabled, computes first and second motion vectors between such B-frame macroblock and such first and second matching macroblocks, respectively; (e) computes first residuals between such B-frame macroblock's pixels and their spatially collocated pixels within such first matching macroblock ("first layer b residuals"), and computes second residuals between such B-frame macroblock's pixels and their spatially collocated pixels within such second matching macroblock ("second layer b residuals"); and (f) if inter-layer residual prediction is enabled, reduces the first and second layer b residuals (on a pixel-by-pixel basis) by subtracting the corresponding layer a macroblock's first and second residuals (on a pixel-by-pixel basis), respectively.

The coding unit 312: (a) receives information from the prediction unit 310 about such motion vectors and/or residuals (collectively "layer b prediction information"); and (b) encodes the layer b prediction information for output as the layer b bit stream. For inter-layer prediction, the coding unit 312 performs such encoding in response to the layer b prediction information, in addition to the scaled information from the scaling unit 320.

Also, a scaling unit 322: (a) receives the layer b prediction information from the prediction unit 310; (b) scales the layer b prediction information up to size of the layer c images; and (c) outputs the scaled layer b prediction information to the prediction unit 314. Similarly, a scaling unit 324: (a) receives information from the coding unit 312 about reconstructing the layer b images (collectively "layer b reconstruction information"); (b) scales the layer b reconstruction information up to size of the layer c images; and (c) outputs the scaled layer b reconstruction information to the coding unit 316.

The layer c encoder performs its operations in response to the layer c images, the scaled layer b prediction information from the scaling unit 322, and the scaled layer b reconstruction information from the scaling unit 324. For intra-layer prediction (with reference to neither the scaled layer b prediction information nor the scaled layer b reconstruction information), the layer c encoder performs the same types of operations as the layer a encoder and outputs a layer c bit stream in response thereto. For inter-layer prediction, the layer c encoder performs the same types of operations as the layer b encoder and outputs the layer c bit stream in response thereto.

A multiplexer 326 receives the layer a bit stream from the coding unit 308, the layer b bit stream from the coding unit 312, and the layer c bit stream from the coding unit 316. The multiplexer 326 combines those bit streams to form a single scalable bit stream, which is the binary logic bit stream discussed hereinabove in connection with FIG. 1. The decoding device 116 decodes the single scalable bit stream by reversing the encoding device 112 operations.

If a resolution capability of the display device 118 is not higher than a resolution of the layer a bit stream, then the decoding device 116 decodes only the layer a bit stream to consume a smaller amount of memory and other computational resources of the system 100. Conversely, if the resolution capability of the display device 118 is higher than a resolution of the layer a bit stream, then the decoding device 116 decodes the layer a bit stream and the layer b bit stream (and, if necessary, the layer c bit stream) to fully exercise such capability, but only to an extent permitted by then-currently available memory and other computational resources of the system 100.

Figure 5:
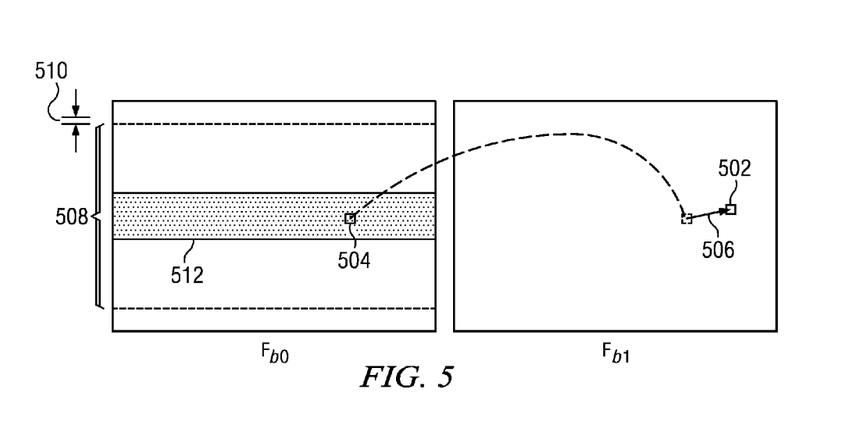
FIG. 5 is a diagram of a matching macroblock being selected by the system of FIG. 1 in a first example for the layer b of FIG. 2.

FIG. 5 is a diagram of a matching macroblock being selected by the system 100 in a first example for the layer b of FIG. 2. In FIG. 5, the image $F_{b1}$ is a representative one of the layer b images, and a macroblock 502 is a representative one of the macroblocks within the image $F_{b1}$. The image $F_{b1}$ is formed by several rows of macroblocks, including a row that contains the macroblock 502 ("current row").

In the example of FIG. 5, for coding the macroblock 502, the system 100 (e.g., the encoding device 112 and/or the decoding device 116): (a) selects a previously coded reference image $F_{b0}$ in a conventional manner; (b) within the image $F_{b0}$, searches for a matching macroblock 504 that is a highest scoring match to the macroblock 502; and (c) codes a motion vector 506 between the macroblocks 502 and 504. Accordingly, coordinates of the macroblock 502 (within the image $F_{b1}$) may differ from coordinates of its matching macroblock 504 (within the image $F_{b0}$).

If the system 100 is an embedded system, then a relatively high percentage of its then-currently available memory (e.g., space and bandwidth) and other computational resources may be consumed by its search for the matching macroblock 504. To reduce such consumption, and to improve efficiency (e.g., speed) in performing the search, the system 100 caches a portion of the image $F_{b0}$ and searches for the matching macroblock 504 within only such portion. In one example, such portion is stored within: (a) a cache memory of the encoding device 112 for encoding operations; and (b) a cache memory of the decoding device 116 for decoding operations.

In the example of FIG. 5, then-currently available space within the cache memory is sufficient for storing a region 508 of the image $F_{b0}$. The region 508 forms a cacheable search window, which includes a number of rows of macroblocks within the image $F_{b0}$. Such number is dependent upon then-currently available space within the cache memory.

The search window includes a row ("collocated row") that is spatially collocated with the current row (which contains the macroblock 502) of the image $F_{b1}$. In response to a global motion vector (e.g., average of macroblocks' respective motion vectors) for the image $F_{b0}$, the system 100 vertically adjusts a position of the search window. Without such adjustment, the search window would be vertically centered above and below the collocated row. In the example of FIG. 5, the system 100 has vertically lowered the position of the search window by an amount 510 in response to the global motion vector, so that the search window is vertically centered below the collocated row.

Figure 6:
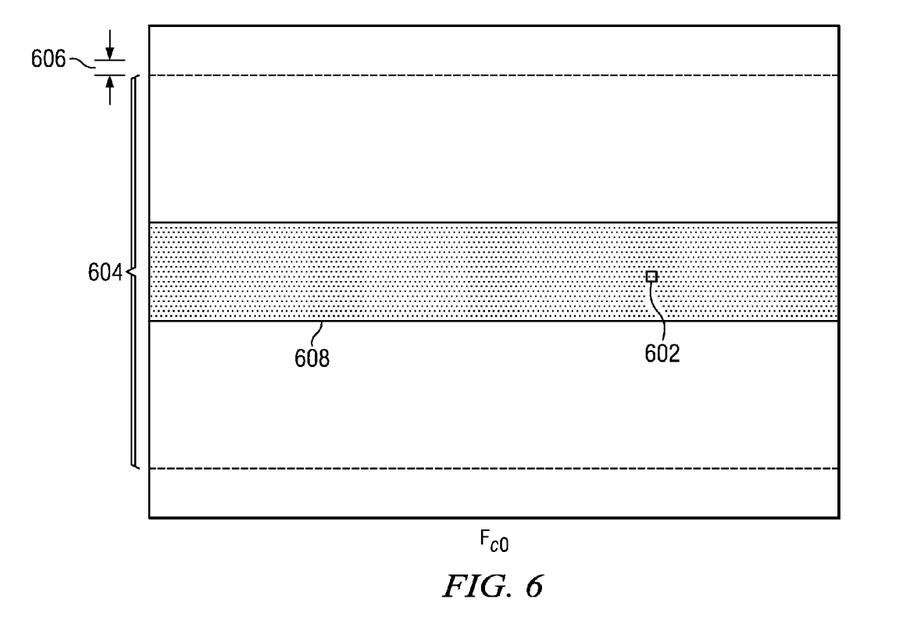
FIG. 6 is a diagram of a matching macroblock being selected by the system of FIG. 1 for the layer c of FIG. 2.

FIG. 6 is a diagram of a matching macroblock being selected by the system 100 for the layer c of FIG. 2. As shown in FIG. 2, the image $F_{c1}$ is temporally collocated with the image $F_{b1}$. Accordingly, a macroblock ("$F_{c1}$ macroblock") within the image $F_{c1}$ is spatially collocated with a scaled version of the macroblock 502 (within the image $F_{b1}$ scaled up to size of the layer c images). For coding the $F_{c1}$ macroblock with inter-layer base mode prediction in the example of FIGS. 5 and 6, the system 100: (a) determines that the $F_{c1}$ macroblock has the same prediction mode as its spatially collocated macroblock 502; and (b) in response to a scaled version of the motion vector 506 (which is coded for the scaled version of the macroblock 502), identifies a matching macroblock 602 as a match to the $F_{c1}$ macroblock. The macroblock 602 is spatially collocated with a scaled version of the macroblock 504 (within the image $F_{b0}$ scaled up to size of the layer c images).

In this example, a portion 604 of the image $F_{c0}$ is spatially collocated with a scaled version of the region 508 (within the image $F_{b0}$ scaled up to size of the layer c images), so that an amount 606 is a likewise scaled version of the amount 510. The portion 604 exceeds then-currently available space within the cache memory. Nevertheless, such space is sufficient for storing a region 608 of the image $F_{c0}$, which is vertically centered within the portion 604, while a remainder of the image $F_{c0}$ is absent from the cache memory. Accordingly, the region 608 forms a cacheable search window within the image $F_{c0}$. In one case, then-currently available space within the cache memory is sufficient for storing an entirety of the image $F_{b0}$, so that the region 508 is an entirety of the image $F_{b0}$, while the region 608 is less than an entirety of the higher resolution image $F_{c0}$.

For example, if the spatial decimation unit 302 (FIG. 3) scales the layer c images by a ratio of 2:1 horizontally and 2:1 vertically to form the layer b images, then the region 608 includes only 50% as many rows of macroblocks as the region 508, because each row in the region 608 is twice as long as each row in the region 508. The region 608 is spatially collocated with a scaled version of a portion 512 (within the image $F_{b0}$ scaled up to size of the layer c images). Accordingly, in the example of FIGS. 5 and 6, the matching macroblock 504 is within the portion 512, so that the matching macroblock 602 is: (a) likewise within the region 608; and (b) present within the cache memory.

Figure 7:
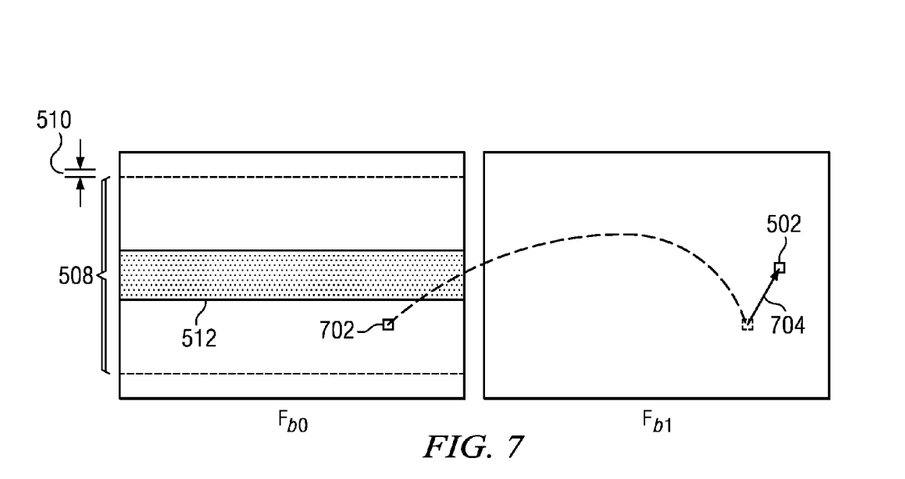
FIG. 7 is a diagram of a matching macroblock being selected by the system of FIG. 1 in a second example for the layer b of FIG. 2.

FIG. 7 is a diagram of a matching macroblock being selected by the system 100 in a second example for the layer b of FIG. 2. In the example of FIG. 7, for coding the macroblock 502, the system 100: (a) selects the previously coded reference image $F_{b0}$ in a conventional manner; (b) within the region 508 of the image $F_{b0}$, searches for a matching macroblock 702 that is a highest scoring match to the macroblock 502; and (c) codes a motion vector 704 between the macroblocks 502 and 702. For coding the $F_{c1}$ macroblock with inter-layer base mode prediction in the example of FIG. 7, the system 100: (a) determines that the $F_{c1}$ macroblock has the same prediction mode as its spatially collocated macroblock 502; and (b) in response to a scaled version of the motion vector 704 (which is coded for the scaled version of the macroblock 502), identifies a different matching macroblock (within the image $F_{c0}$).

Such different matching macroblock (within the image $F_{c0}$) would be spatially collocated with a scaled version of the macroblock 702 (within the image $F_{b0}$ scaled up to size of the layer c images). Accordingly, in the example of FIG. 7 (in contrast to the example of FIGS. 5 and 6), the matching macroblock 702 is outside the portion 512, so that such different matching macroblock (within the image $F_{c0}$) would be: (a) likewise outside the region 608 of FIG. 6; and (b) absent from the cache memory. Such absence would diminish an advantage of inter-layer base mode prediction.

In a third example, a highest scoring match (within the image $F_{b0}$) for the macroblock 502 is: (a) the macroblock 702 within the entire region 508 (which includes the portion 512) and (b) the macroblock 504 within the portion 512. In the third example, if the system 100 codes the motion vector 506 for the macroblock 502, then quality in coding of the layer b images is diminished (because the macroblock 702 is better than the macroblock 504 as a match to the macroblock 502), but quality in coding of the layer c images is augmented for inter-layer base mode prediction (because the macroblock 504 is within the portion 512). Conversely, in the third example, if the system 100 codes the motion vector 704 for the macroblock 502, then quality in coding of the layer b images is augmented (because the macroblock 702 is better than the macroblock 504 as a match to the macroblock 502), but quality in coding of the layer c images is diminished for inter-layer base mode prediction (because the macroblock 702 is outside the portion 512). Accordingly, in the third example, the system 100 selects between the motion vector 506 and the motion vector 704 to code for the macroblock 502.

Figure 8:
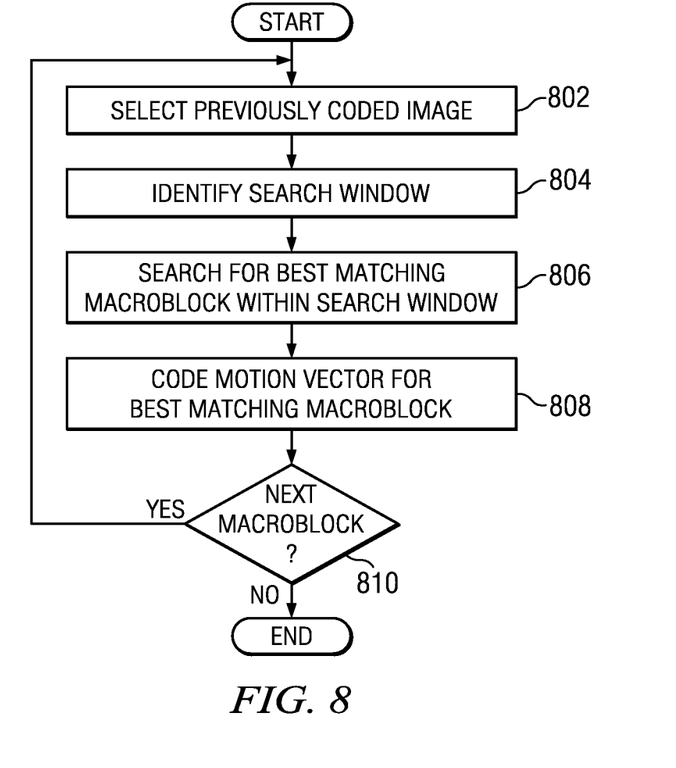
FIG. 8 is a flowchart of operation of the system of FIG. 1.

FIG. 8 is a flowchart of operation of the system 100. For the representative macroblock 502, the operation begins at a step 802, at which the system 100 selects the previously coded reference image $F_{b0}$ in a conventional manner. At a next step 804, the system 100 identifies the region 508 as the cacheable search window of the image $F_{b0}$. At a next step 806, the system 100 searches for the highest scoring (or "best") match by computing a respective coding cost of each macroblock within the region 508, so that the highest scoring match is a macroblock whose respective coding cost is lowest (from among such respective coding costs of all macroblocks within the region 508). Accordingly, the respective coding costs are inversely proportional to respective scores of the macroblocks within the region 508.

At a next step 808, the system 100 codes a motion vector between such highest scoring matching macroblock and the macroblock 502. At a next step 810, the system 100 determines whether a next macroblock remains to be coded. In response to the system 100 determining that a next macroblock remains to be coded, the operation returns from the step 810 to the step 802 for coding of such next macroblock. Conversely, in response to the system 100 determining (at the step 810) that a next macroblock does not remain to be coded, the operation ends.

Referring again to the step 806, if a macroblock is located within the portion 512, then the system 100 computes such macroblock's respective coding cost according to Cost=SAD+λ·mvBits, where: (a) SAD is a sum of absolute differences between pixels of such macroblock (within the region 508) and pixels of the macroblock 502 (within the image $F_{b1}$); (b) mvBits is a number of bits for coding a motion vector between such macroblock and the macroblock 502; and (c) λ is a Lagrange multiplier. By comparison, if a macroblock is located within the region 508, yet outside the portion 512, then the system 100 increases such macroblock's respective coding cost by adding a non-negative value ELCost to such macroblock's respective coding cost, so that the system 100 computes such macroblock's respective coding cost according to Cost=SAD+λ·mvBits+ELCost. In that manner, the system 100 penalizes scores of macroblocks outside the portion 512 versus scores of macroblocks within the portion 512.

In a first embodiment, ELCost is a constant amount. In a second embodiment, ELCost is an SAD-dependent variable amount, such as: (a) ELCost=c·SAD, where c is a constant; or (b) ELCost=c·λ·SAD. In the illustrative embodiments, the system 100 is operable to vary ELCost per video sequence, so that a video sequence (e.g., including the images $F_{b0}$ and $F_{b1}$) has its own respective ELCost. In one example, the video sequence (respective ELCost increases (or decreases) in proportion to importance (or unimportance) of quality in coding of such video sequence's enhancement layer images (e.g., layer c images).

In experiments with reference layer images (at 720p resolution) scaled to enhancement layer images (at 1080p resolution), ELCost was a constant amount for computing respective coding costs of macroblocks outside the portion 512. By increasing the constant ELCost to a relatively large value in such experiments, the highest scoring matches were macroblocks within the portion 512. Such experiments improved quality in coding of the enhancement layer images (e.g., up to 1.20 dB, or 0.22 dB on average) without significant loss of quality in coding of the reference layer images.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by a combination of electronic circuitry components for coding a motion vector, the method comprising:
   from among blocks within a region of a first image, searching for a highest scoring match to a block of a second image, wherein searching for the highest scoring match includes penalizing scores of blocks outside a portion of the region without penalizing scores of blocks within the portion of the region, and wherein the portion of the region is less than an entirety of the region;
   coding the motion vector between the block of the second image and the highest scoring match; and
   in response to a scaled version of the motion vector, identifying a block of a third image as a match to a block of a fourth image;
   wherein: the third image is a higher resolution version of the first image; the fourth image is a higher resolution version of the second image;
   the portion of the region of the first image is spatially collocated with a cacheable portion of the third image if the first image is scaled up to size of the third image;
   the block of the second image is spatially collocated with the block of the fourth image if the second image is scaled up to size of the fourth image; and
   the cacheable portion of the third image is less than an entirety of the third image.

2. The method of claim 1, wherein penalizing scores includes:
   computing respective coding costs of the blocks within the region of the first image, wherein the respective coding costs are inversely proportional to respective scores of the blocks within the region of the first image; and
   increasing the respective coding costs of the blocks outside the portion of the region of the first image.

3. The method of claim 2, wherein increasing the respective coding costs includes:
   adding a constant amount to the respective coding costs.

4. The method of claim 2, wherein increasing the respective coding costs includes:
   adding a variable amount to the respective coding costs.

5. The method of claim 2, wherein computing the respective coding costs includes:
   computing respective differences between the block of the second image and the blocks within the region of the first image.

6. The method of claim 1, further comprising:
   coding residuals between the identified block and the block of the fourth image.

7. The method of claim 6, wherein the region of the first image is an entirety of the first image.

8. The method of claim 6, wherein searching for the highest scoring match includes searching for the highest scoring match within a memory that stores an entirety of the region of the first image.

9. The method of claim 6, wherein identifying the block includes identifying the block within a memory that stores an entirety of the cacheable portion of the third image, while a remainder of the third image is absent from the memory.

10. The method of claim 1, wherein the blocks are macroblocks.

11. A system for coding a motion vector, the system comprising:
    a combination of electronic circuitry components for:
    from among blocks within a region of a first image, searching for a highest scoring match to a block of a second image, wherein searching for the highest scoring match includes penalizing scores of blocks outside a portion of the region without penalizing scores of blocks within the portion of the region, and wherein the portion of the region is less than an entirety of the region;
    coding the motion vector between the block of the second image and the highest scoring match; and,
    in response to a scaled version of the motion vector, identifying a block of a third image as a match to a block of a fourth image;
    wherein: the third image is a higher resolution version of the first image; the fourth image is a higher resolution version of the second image;
    the portion of the region of the first image, is spatially collocated with a cacheable portion of the third image if the first image is scaled up to size of the third image; the block of the second image is spatially collocated with the block of the fourth image if the second image is scaled up to size of the fourth image; and the cacheable portion of the third image is less than an entirety of the third image.

12. The system of claim 11, wherein penalizing scores includes:
  computing respective coding costs of the blocks within the region of the first image, wherein the respective coding costs are inversely proportional to respective scores of the blocks within the region of the first image; and
  increasing the respective coding costs of the blocks outside the portion of the region of the first image.

13. The system of claim 12, wherein increasing the respective coding costs includes:
  adding a constant amount to the respective coding costs.

14. The system of claim 12, wherein increasing the respective coding costs includes:
  adding a variable amount to the respective coding costs.

15. The system of claim 12, wherein computing the respective coding costs includes:
  computing respective differences between the block of the second image and the blocks within the region of the first image.

16. The system of claim 11, wherein the combination of electronic circuitry components is for:
  coding residuals between the identified block and the block of the fourth image.

17. The system of claim 16, wherein the region of the first image is an entirety of the first image.

18. The system of claim 16, wherein searching for the highest scoring match includes searching for the highest scoring match within a memory that stores an entirety of the region of the first image.

19. The system of claim 16, wherein identifying the block includes identifying the block within a memory that stores an entirety of the cacheable portion of the third image, while a remainder of the third image is absent from the memory.

20. The system of claim 11, wherein the blocks are macroblocks.

21. A computer program product for coding a motion vector, the computer program product comprising:
  a non-transitory computer-readable storage medium; and
  a computer-readable program stored on the non-transitory computer-readable storage medium, wherein the computer-readable program is processable by a combination of electronic circuitry components for causing the combination of electronic circuitry components to perform operations including:
  from among blocks within a region of a first image, searching for a highest scoring match to a block of a second image, wherein searching for the highest scoring match includes penalizing scores of blocks outside a portion of the region without penalizing scores of blocks within the portion of the region, and wherein the portion of the region is less than an entirety of the region;
  coding the motion vector between the block of the second image and the highest scoring match; and,
  in response to a scaled version of the motion vector, identifying a block of a third image as a match to a block of a fourth image;
  wherein: the third image is a higher resolution version of the first image; the fourth image is a higher resolution version of the second image; the portion of the region of the first image is spatially collocated with a cacheable portion of the third image if the first image is scaled up to size of the third image; the block of the second image is spatially collocated with the block of the fourth image if the second image is scaled up to size of the fourth image; and the cacheable portion of the third image is less than an entirety of the third image.

22. The computer program product of claim 21, wherein penalizing scores includes:
  computing respective coding costs of the blocks within the region of the first image, wherein the respective coding costs are inversely proportional to respective scores of the blocks within the region of the first image; and
  increasing the respective coding costs of the blocks outside the portion of the region of the first image.

23. The computer program product of claim 22, wherein increasing the respective coding costs includes:
  adding a constant amount to the respective coding costs.

24. The computer program product of claim 22, wherein increasing the respective coding costs includes:
  adding a variable amount to the respective coding costs.

25. The computer program product of claim 22, wherein computing the respective coding costs includes:
  computing respective differences between the block of the second image and the blocks within the region of the first image.

26. The computer program product of claim 21, wherein the operations include:
  coding residuals between the identified block and the block of the fourth image.

27. The computer program product of claim 26, wherein the region of the first image is an entirety of the first image.

28. The computer program product of claim 26, wherein searching for the highest scoring match includes searching for the highest scoring match within a memory that stores an entirety of the region of the first image.

29. The computer program product of claim 26, wherein identifying the block includes identifying the block within a memory that stores an entirety of the cacheable portion of the third image, while a remainder of the third image is absent from the memory.

30. The computer program product of claim 21, wherein the blocks are macroblocks.

* * * * *